Figure 1:
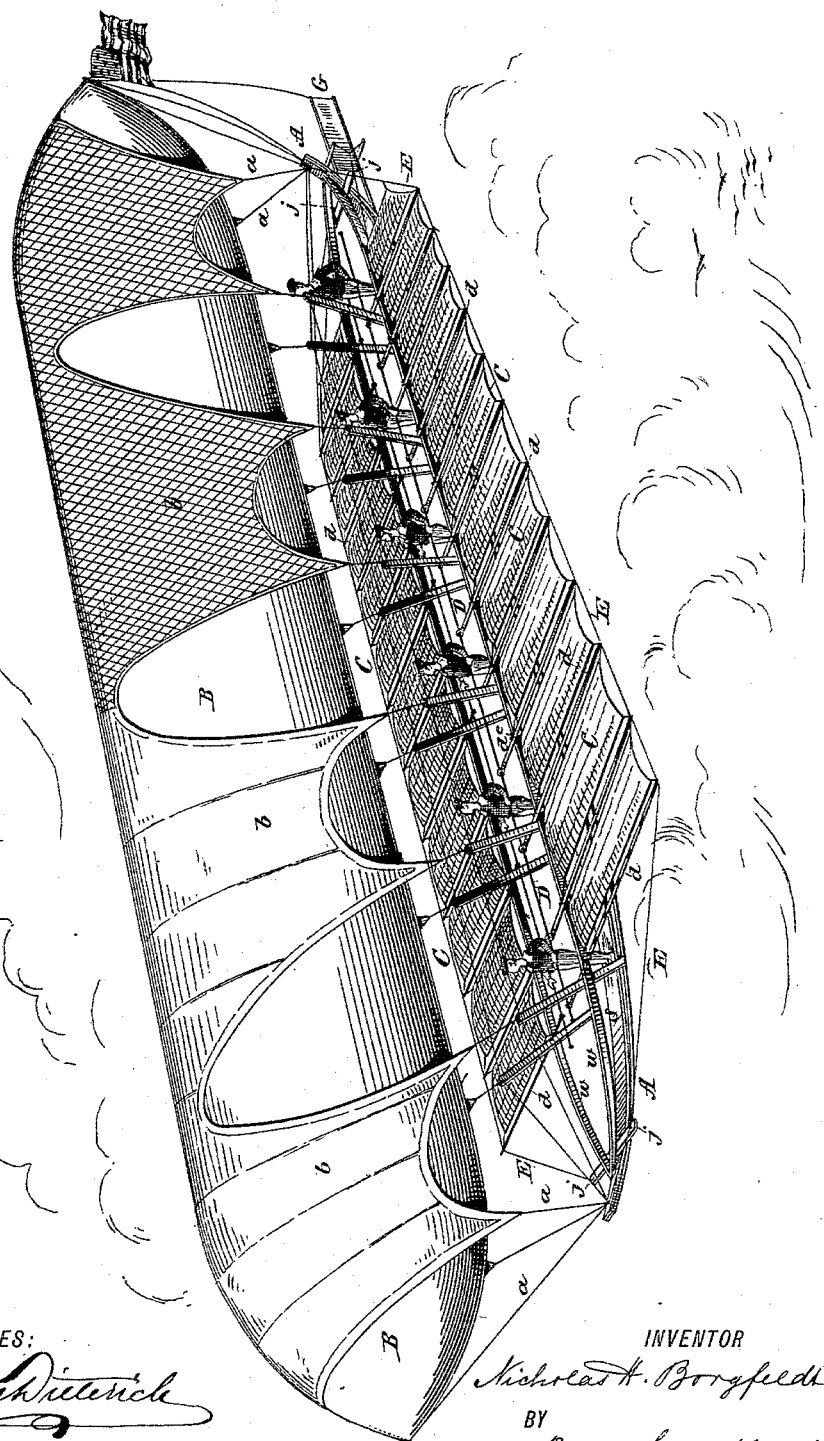

(No Model.)

7 Sheets—Sheet 1.

N. H. BORGFELDT.
FLYING MACHINE.

No. 411,779. Patented Oct. 1, 1889.

WITNESSES:
Gustave Dieterich
John M. Speer.

INVENTOR
Nicholas H. Borgfeldt.
BY
Briesen, Steele & Knauth
ATTORNEYS

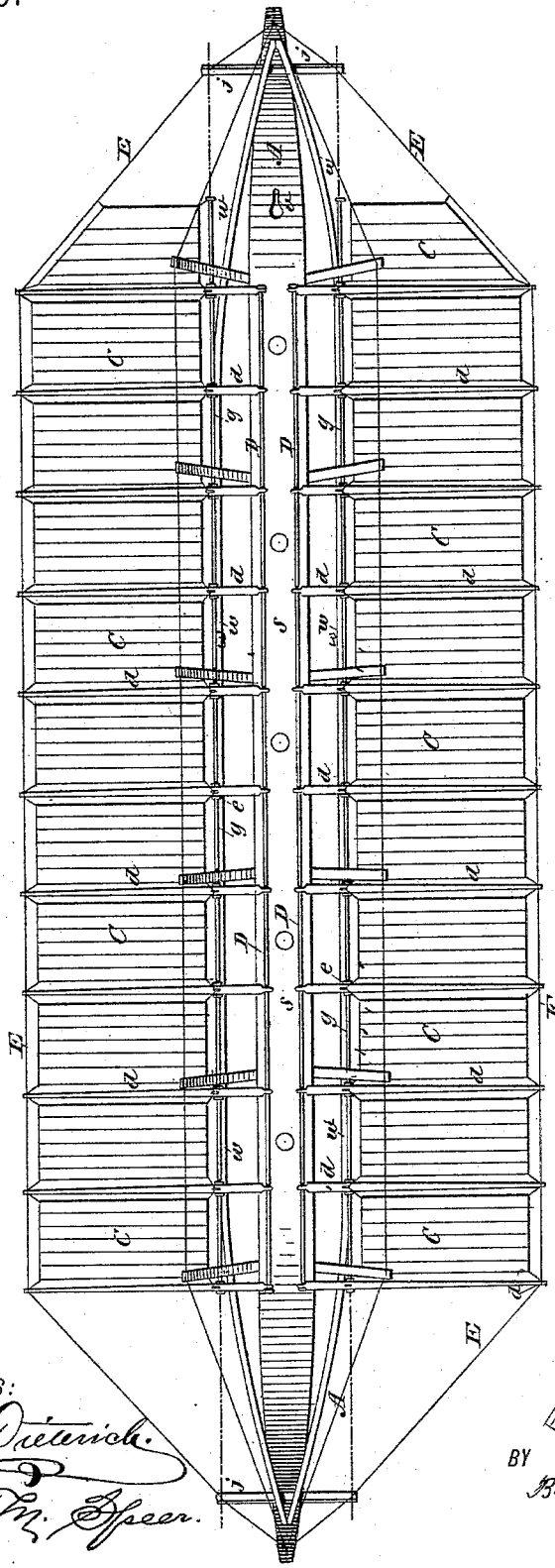

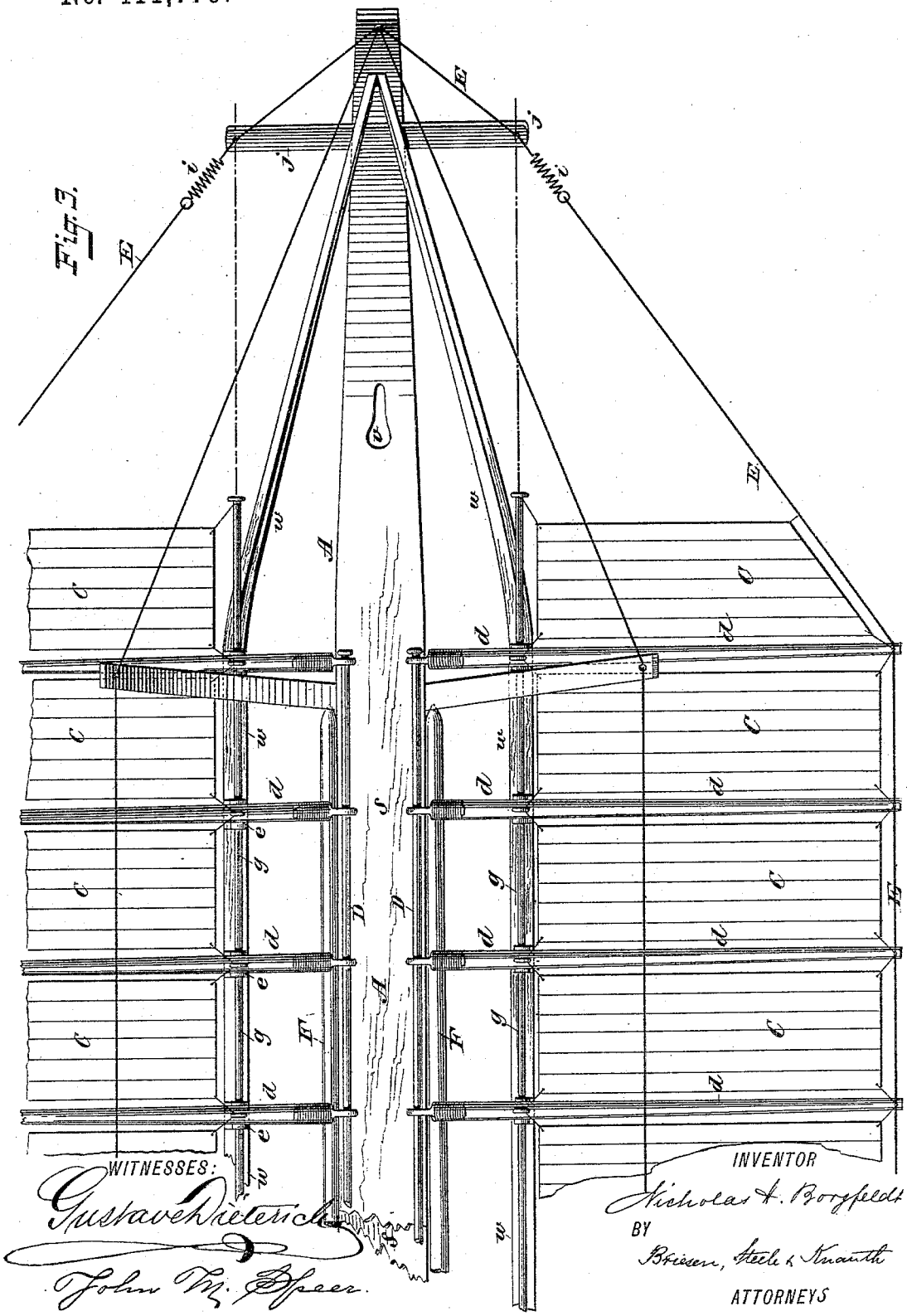

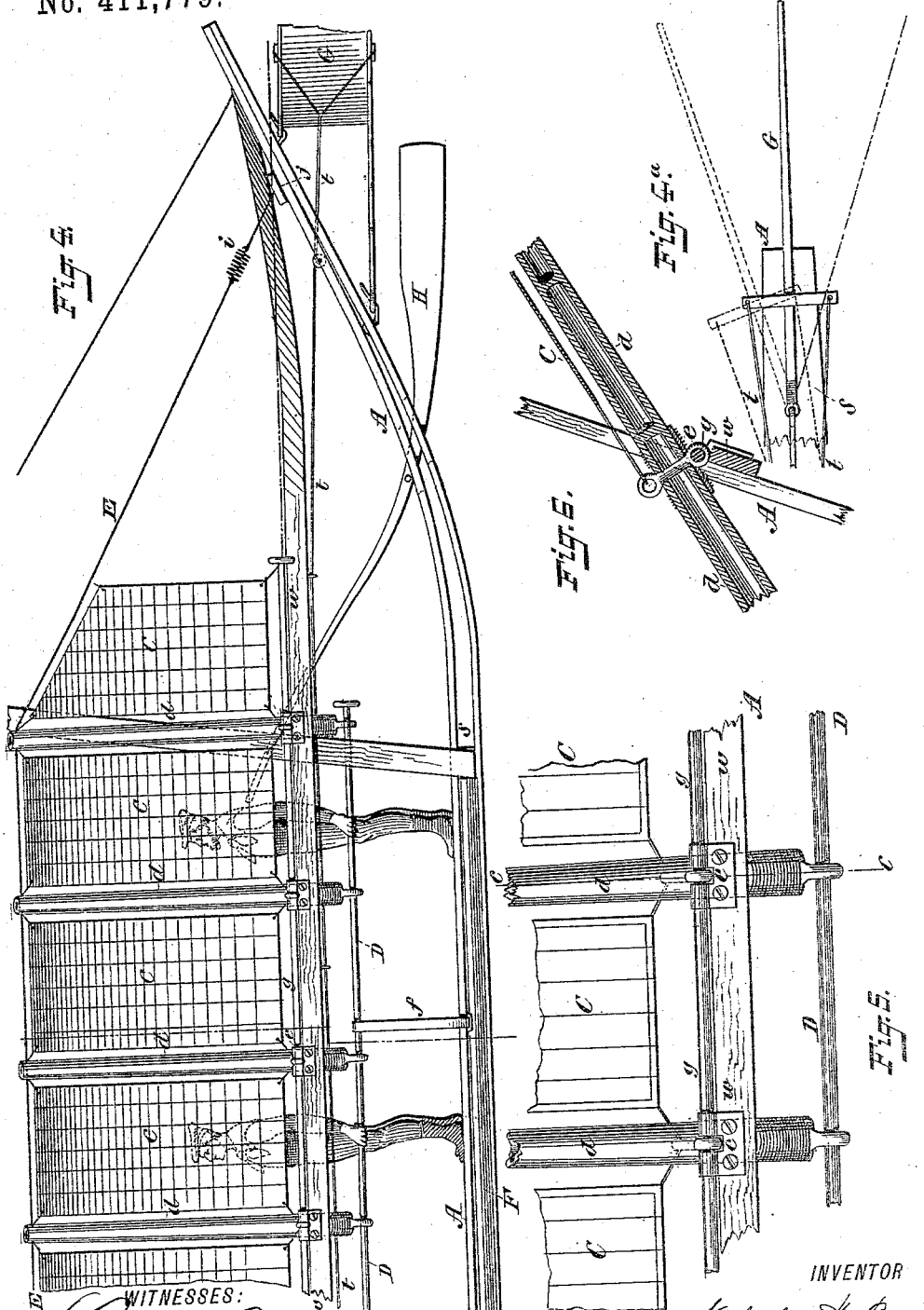

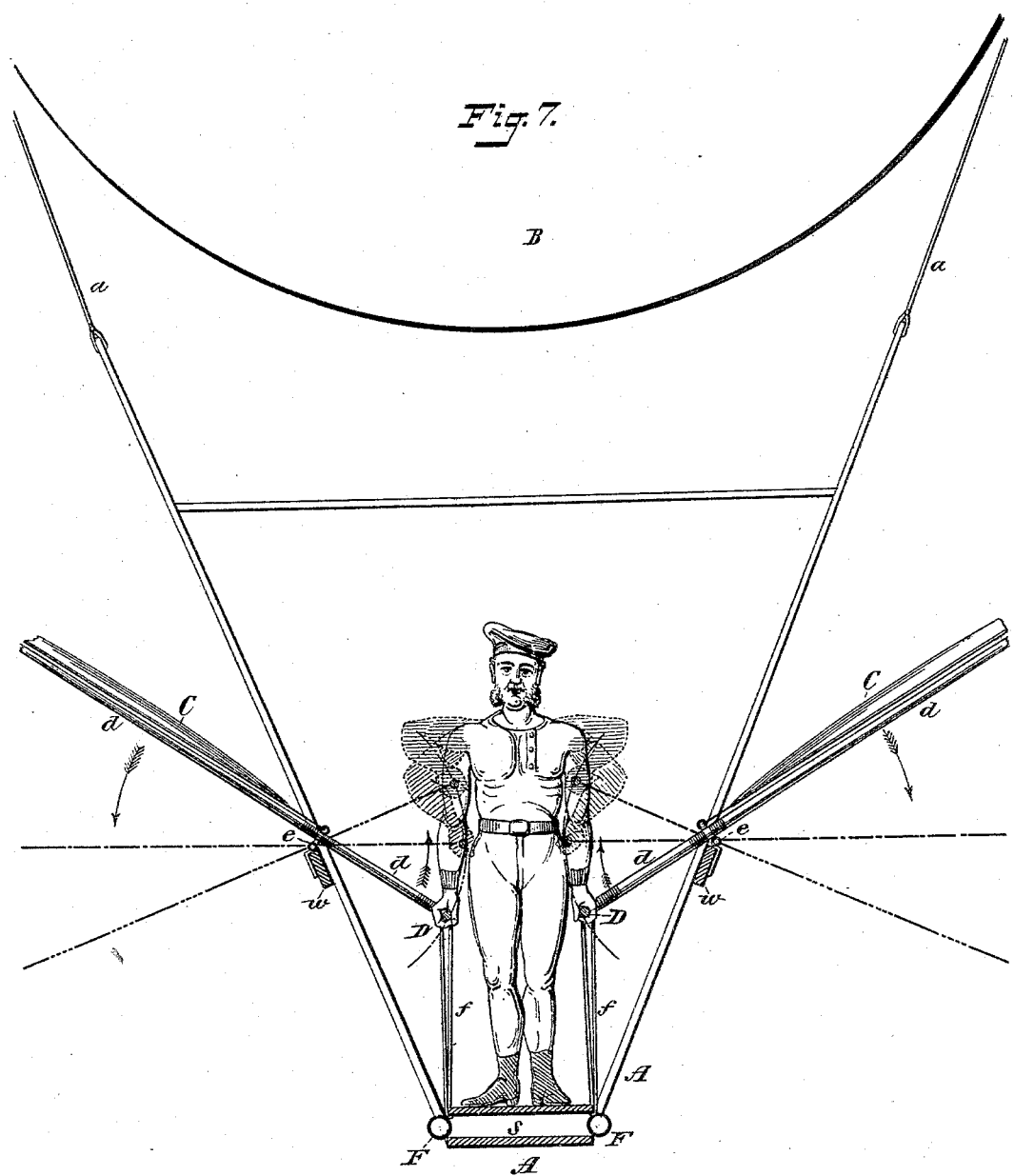

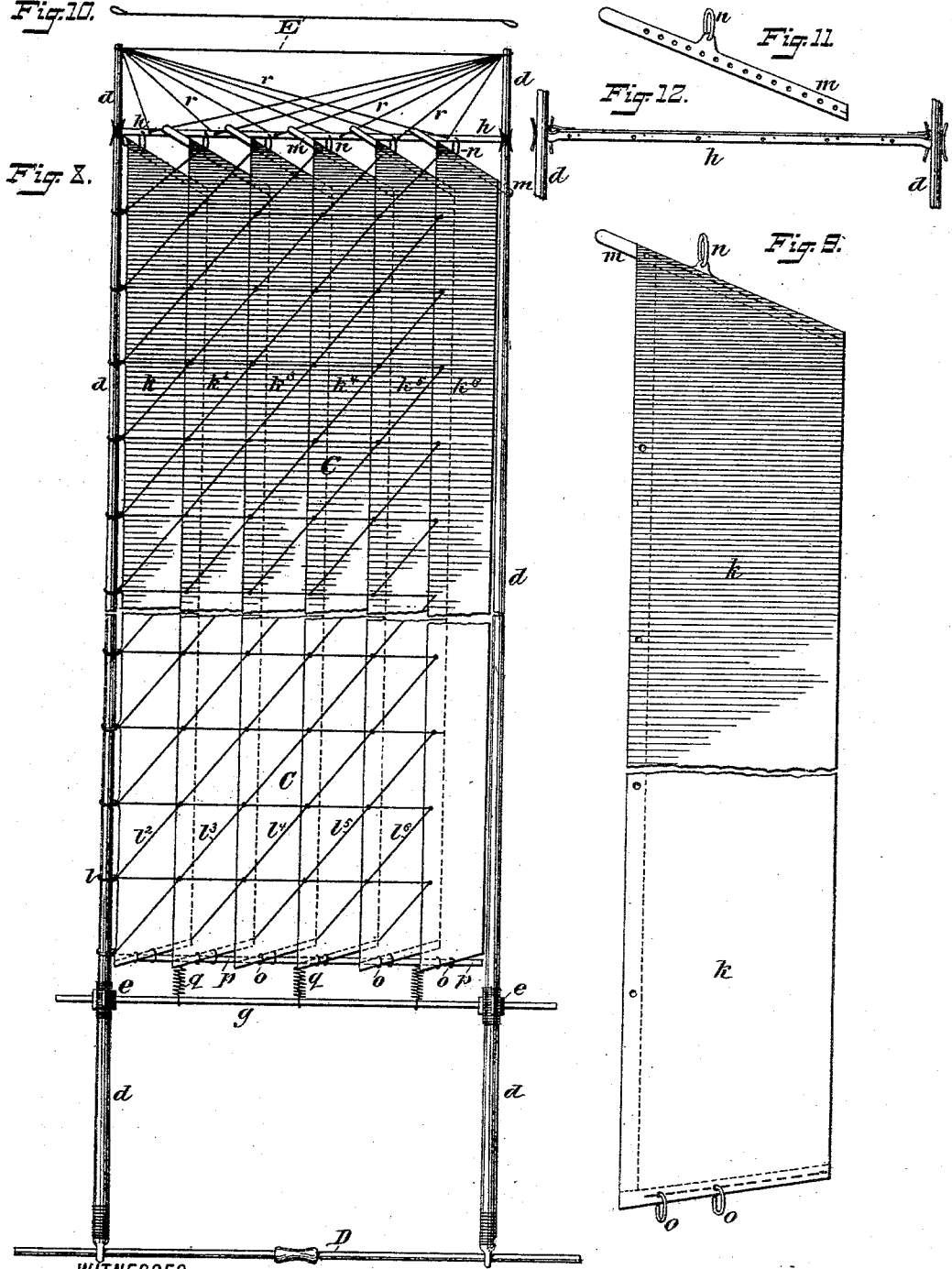

(No Model.) 7 Sheets—Sheet 7.
N. H. BORGFELDT.
FLYING MACHINE.
No. 411,779. Patented Oct. 1, 1889.
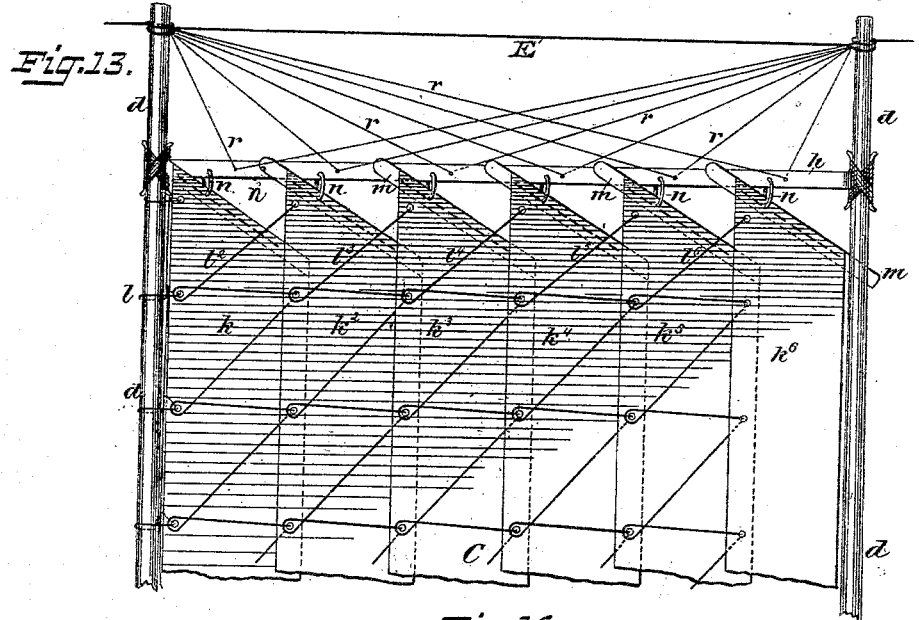
Fig. 13.
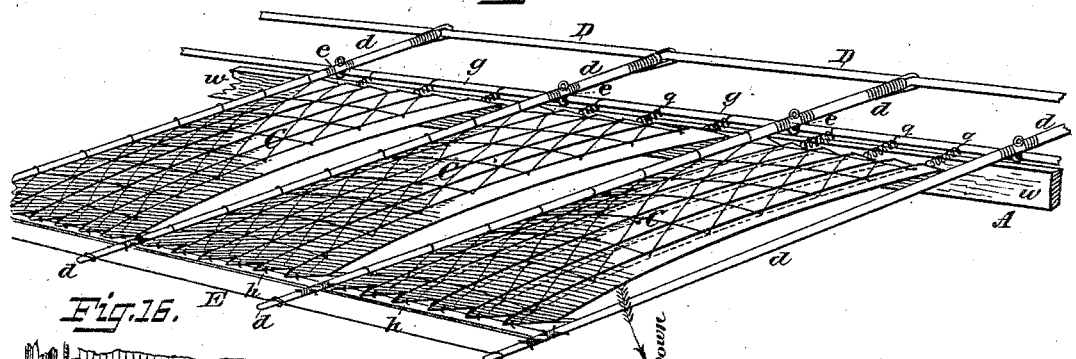
Fig. 14.
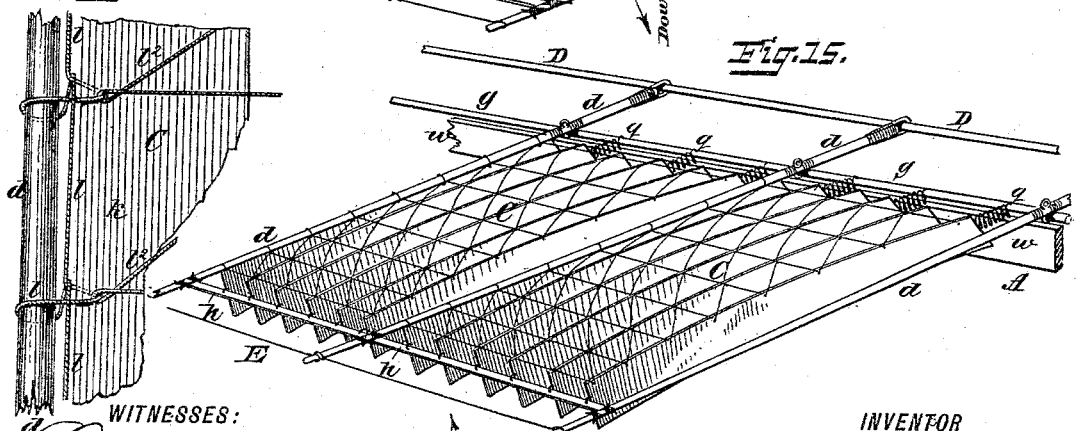
Fig. 16.
Fig. 15.
WITNESSES:
Gustave Dieterich
John W. Speer
INVENTOR
Nicholas H. Borgfeldt.
BY
Briesen, Steele & Knauth
ATTORNEYS

UNITED STATES PATENT OFFICE.

NICHOLAS H. BORGFELDT, OF BROOKLYN, NEW YORK.

FLYING-MACHINE.

SPECIFICATION forming part of Letters Patent No. 411,779, dated October 1, 1889.

Application filed November 3, 1888. Serial No. 289,878. (No model.)

*To all whom it may concern:*

Be it known that I, NICHOLAS H. BORGFELDT, a resident of Brooklyn, in the county of Kings and State of New York, have invented a new and Improved Flying-Machine, of which the following is a full, clear, and exact description, reference being had to the accompanying drawings, in which—

Figure 1 represents a perspective view of my improved flying-machine. Fig. 2 is a plan or top view of the lower part or car thereof. Fig. 2ª is a side view of the front portion of said car. Fig. 3 is an enlarged top view of the rear or stern portion of said car. Fig. 4 is a side view thereof. Fig. 4ª is a detail bottom view of the rudder. Fig. 5 is a detail side view of part of the wing-actuating mechanism. Fig. 6 is a detail section on the line $c$ $c$, Fig. 5. Fig. 7 is a vertical cross-section of the car, showing also the lower part of the balloon. Fig. 8 is an enlarged plan view of one of the wings used in the flying-machine. Fig. 9 is a still more enlarged face view of one of the sails of said wing. Fig. 10 is a side view of one of the cross-braces at the end of the wing. Fig. 11 is a perspective view of one of the stiffeners in the end of the sail. Fig. 12 is a detail face view of one of the cross-braces of the wing. Fig. 13 is an enlarged view of one end of a wing. Fig. 14 is a perspective view of several of the wings while moving downward. Fig. 15 is a similar perspective view of several wings while moving upward, and Fig. 16 is a detail view showing how the sails in the wing are laced together.

This invention relates to a new flying apparatus so constructed that it may conveniently be moved up into and along in the atmospheric strata and used on water if necessary.

The apparatus to be described differs from balloons and flying apparatuses heretofore proposed in that it shall be so balanced that the balloon connected therewith will be incapable of elevating the car and the contents thereof by its own buoyancy, the wings being required to cause the whole apparatus to rise.

The invention consists of the sundry details of improvement that are hereinafter more fully specified.

In the accompanying drawings, the letter A represents a car or main vessel of my improved flying apparatus.

B is a cigar-shaped balloon, from which the car A is suspended by ropes $a$ $a$, that extend to a covering $b$ of the balloon, as is more clearly indicated in Fig. 1 of the drawings.

C C are a series of wings arranged at the sides of the car and intended to propel the same through the air. Fig. 1 shows twelve such wings on each side of the car; but their number may of course be increased or decreased at will. The several wings C C are connected to the actuating-rods $d$ $d$, that extend laterally from the car, the series of rods on each side of the car being at their inner ends—that is, within the body of the car—connected by a long handle-bar D. At the edge of the car A where the rods $d$ rest on the car, they are hinged thereto, as at $e$ in the drawings. Thus a person standing on the floor of the car, as is represented in Fig. 7 of the drawings, and grasping the two handle-bars D D will be enabled to move them up and down, and thereby to move the wings C C from the position shown in full lines in Fig. 7 into the position shown by dotted lines in the same figure. Inasmuch as the downward stroke of each wing is intended to be the effective stroke, the operators may be assisted in quickly getting the wings raised for another downward stroke by the use of spring-bands $f$, which unite the handle-bars to the car, as is shown in Fig. 7 of the drawings, and which bands also serve to balance the wings.

I have represented in the drawings the handle-bars D D as adapted to be worked by men standing on the platform or floor of the car, the apparatus shown being adapted, as Fig. 1 represents, to hold six operators, whose combined efforts are used to move the wings up and down; but, instead of human agency, machinery may be employed for raising and lowering the handle-bars D D, and thus moving the wings the same as they would be moved by human agency. The rods $d$ $d$, that extend laterally from the car and hold the wings, are pivoted in the hinge-pieces $e$ by long rods $g$, as shown; but separate pivot-pins may be employed, one for each rod $d$.

For the purpose of making an operative flying-machine in accordance with this invention, I prefer to make the rods $d$ hollow and slightly flexible, using for the purpose, by preference, bamboo sticks. The hinge-pieces $e$ may be connected to such hollow sticks in the manner indicated in Figs. 5 and 6 of the drawings, the longitudinal rod or pivot-pin $g$ passing through the eyes of said hinge-pieces, as is clearly there represented. In addition to the handle-bars D, which unite the series of rods $d$ on the inner side of the car, the outer ends of said rods $d$ are further braced in pairs by intermediate braces $h$, as in Fig. 13, that are tied at their ends to the rods $d$ $d$, between which they are placed. The outermost ends of the rods $d$ $d$ are united to a wire rope or flexible stay E, which, as Fig. 3 shows, extends also to the end of the car, a spring $i$ being, if desired, interposed in each wire rope E, for the purpose of rendering the same more thoroughly flexible when that should be necessary.

A traverse $j$ may be connected to the end of the car, as in Fig. 3, to help hold the end of each wire rope E in proper position, the point of connection of the rope ends E and car-body being in line with the hinge-centers $e$.

From what has been described it will be perceived that the rods $d$ $d$ on each side of the car A are properly united to the handle-bars and to the sundry braces heretofore alluded to, so that they will be moved simultaneously whenever their handle-bar is moved up and down. Between every two rods $d$ $d$ there is a wing C. This wing, as the detail views, Figs. 8 to 13, more fully show, is composed of sundry sails $k$ $k^2$ $k^3$, &c., Figs. 8 and 13 showing six sails to each wing; but the number of such sails may be varied. It will be perceived also, from an inspection of Figs. 8 and 13, that the sails of each wing are united only to one rod $d$, and not to both of the rods between which the wing is placed. This junction is made with the aid of ropes, wires, or cords, as is shown more clearly in Figs. 13 and 16. Thus the sail $k$ nearest one rod $d$ is tied thereto by a cord $l$, that passes through holes in the sail and then around the rod $d$, and is then looped over the part passed through the sail, and so on, as is clearly represented in Fig. 16. The next adjoining sail $k^2$ is united to the sail $k$ by a cord $l^2$, which passes through holes in the sail $k^2$ and is looped around the cord $l$ in manner represented in Fig. 13 and partly shown, also, in Fig. 16. The next sail $k^3$ is joined to $k^2$ by a cord $l^3$, looped over the cord $l^2$ in the same manner in which the cord $l^2$ is looped over the cord $l$, and so along with all the sails of each wing, each sail being by a cord, such as has been shown and described, united at one edge to the cord holding the adjoining sail in position, &c. The outer ends of the sails are laid around stiffener-bars $m$, which by loops $n$ are, near the fast or laced edge of each sail, united to the brace $h$, as appears clearly from an inspection of Fig. 13 of the drawings. Fig. 11 represents one of these stiffener-bars $m$ and its loop $n$ in perspective view. The inner end of each sail is by two loops $o$ $o$ united to a rod $p$, which is connected by springs $q$ to the rod $g$, as in Fig. 8, or to the bar $w$ of the car that holds the hinges $e$. It will be seen that each sail, being held by its own cord $l$ only near one edge and free at the other edge, is free to move from the flat position, where one sail overlaps the other, (see Fig. 14,) into the open position. (See Fig. 15.) It will also be clear that, each sail being held near its inner end by two loops $o$, while at its outer end it is held by a single loop $n$, the outer portion of each wing has a greater degree of flexibility than the inner, and that the sails will be more stiffly held by the double loops at their inner ends than by the single loops at their outer ends, the tendency of the double inner loops being to hold the sails there nearer to the overlapping position. The outer braces $h$ of the wings may be stayed by cords, wires, or rods $r$ $r$ diagonally to the respective rods $d$ $d$, as in Fig. 13.

The body of the car A is by preference made to resemble the skeleton of a ship with raised bow and stern and with a bottom platform $s$, on which the men or machinery for operating the wings can stand. To this bottom platform are secured long hollow cylinders F F, that are filled with air or the like, to be used as floats for preventing the car from sinking in case it should strike water. At the stern of the car is hinged thereto a suitable air-rudder G, which can be worked by rudder-chains $t$, leading to treadles $u$, as in Fig. 2$^a$, so that by depressing one of these treadles the rudder G may be swung to one side, while by depressing the other treadle it will be swung to the opposite side; but other well-known means for swinging the rudder in the desired manner may be employed. Near the stern the raised portion of the car has a hole $v$, through which, in case of necessity, a ship's rudder H can be inserted for steering the car on water should it touch the same.

The operation of this flying-machine is substantially as follows: It is supposed to be so ballasted that the balloon B will be incapable of lifting the car and its occupants from the ground. The wings will be needed to bring about the desired elevation. Whenever the wings are raised, as in Fig. 15, the sails open, so that they will pass conveniently through the air; but when the wings are moved down the sails close, as in Fig. 14, thereby constituting large surfaces for pressing upon the air beneath them and causing the vessel to ascend. At the same time each wing, being held only at one edge and free at the opposite edge, is capable of bulging up at its free edge, as in Fig. 14, thus giving to the actuating-wing during its descending motion a certain desirable slant, by which a forward direction will be imparted to the progress of the vessel through the air—in other words, whenever the wings move down they press upon the stratum of air beneath, so as to have a tendency of elevating the car, and at the same time they are inclined or bulged, so that the elevating motion will also be a forward motion entirely analogous to the action of a bird's wing in the act of flying. Whenever the wings are raised and the sails made to open, as in Fig. 15, their inclination, owing to each sail being fast at one longitudinal edge only, will be such during the elevating movement as to also assist in imparting to the car or vessel a forward movement. The flexibility of the rods $d$ assists materially in the proper operation of the wings and in bringing about the result which experiments have demonstrated—viz., that of moving a substantially though not quite buoyant body through the air with the aid of sails that are free to open and overlap and to bulge, being fast along one longitudinal edge only.

The raised ends of the car-body A are made springy, so that in case the same should strike ground or water they will yield, and thus prevent accidents that would happen if the car-body were made substantially rigid. The springs $q$ at the inner ends of the sails assist materially in bringing about the opening and overlapping and the bulging positions to which reference has heretofore been made.

Having now described my invention, what I claim is—

1. In a flying-machine, the combination of a car-body with a series of laterally-projecting flexible rods $d$ $d$, and a series of wings C C, arranged between said rods, each of said wings being attached to one of said rods only, substantially as and for the purpose described.

2. In a flying-machine, the combination of the laterally-extending flexible rods $d$ with the series of sails $k$ $k^2$ $k^3$, &c., arranged between said rods to constitute wings C, each of said sails being fastened, on a line parallel to said rods $d$, directly to one of the rods $d$ only and along one longitudinal edge only, all for the purpose of enabling the sails to overlap and open alternately, and also to bulge, substantially as specified.

3. The combination of the car-body A with the laterally-projecting flexible rods $d$ $d$, the handle-bars D, and outer continuous flexible braces E, with the wings C, placed between said rods $d$, each wing being fastened to one of the two rods only between which it is placed, substantially as herein shown and described.

4. The wing C, composed of sails $k$ $k^2$ $k^3$, &c., and of the cords $l$ $l^2$ $l^3$, &c., each sail having a single loop $n$ at the outer end and several loops $o$ $o$ at the inner end, substantially as herein shown and described.

5. The combination of the flexible wing-rods $d$ $d$, with their connecting-bar D, at the inner ends connecting-rope E, at the outer ends connecting-brace $h$, near their outer ends sails $k$ $k^2$ $k^3$, &c., their end loops $n$ $o$ $o$, inner rod $p$, for connecting with the loops $o$ $o$, and springs $q$, holding the rod $p$, substantially as and for the purpose described.

6. The wing C, composed of sails $k$ $k^2$ $k^3$, &c., that are held along one longitudinal edge only, in combination with the springs $q$ at the inner ends of said sails, acting longitudinally on the same, as described.

7. The combination of the wings C, each having for its base one straight flexible rod $d$, which is hinged to the car-body, with the car-body and with the outer continuous flexible brace E, that connects with the rods $d$ and with the car-body, as described.

8. The pivoted wing-rods $d$ $d$, combined with the car-body A and with the outer flexible brace E, whose ends are joined to the car-body at points aligned with the hinge-centers $e$ of the rods $d$, as specified.

NICHOLAS H. BORGFELDT.

Witnesses:
GUSTAV SCHNEPPÉ,
HARRY M. TURK.